UNITED STATES PATENT OFFICE.

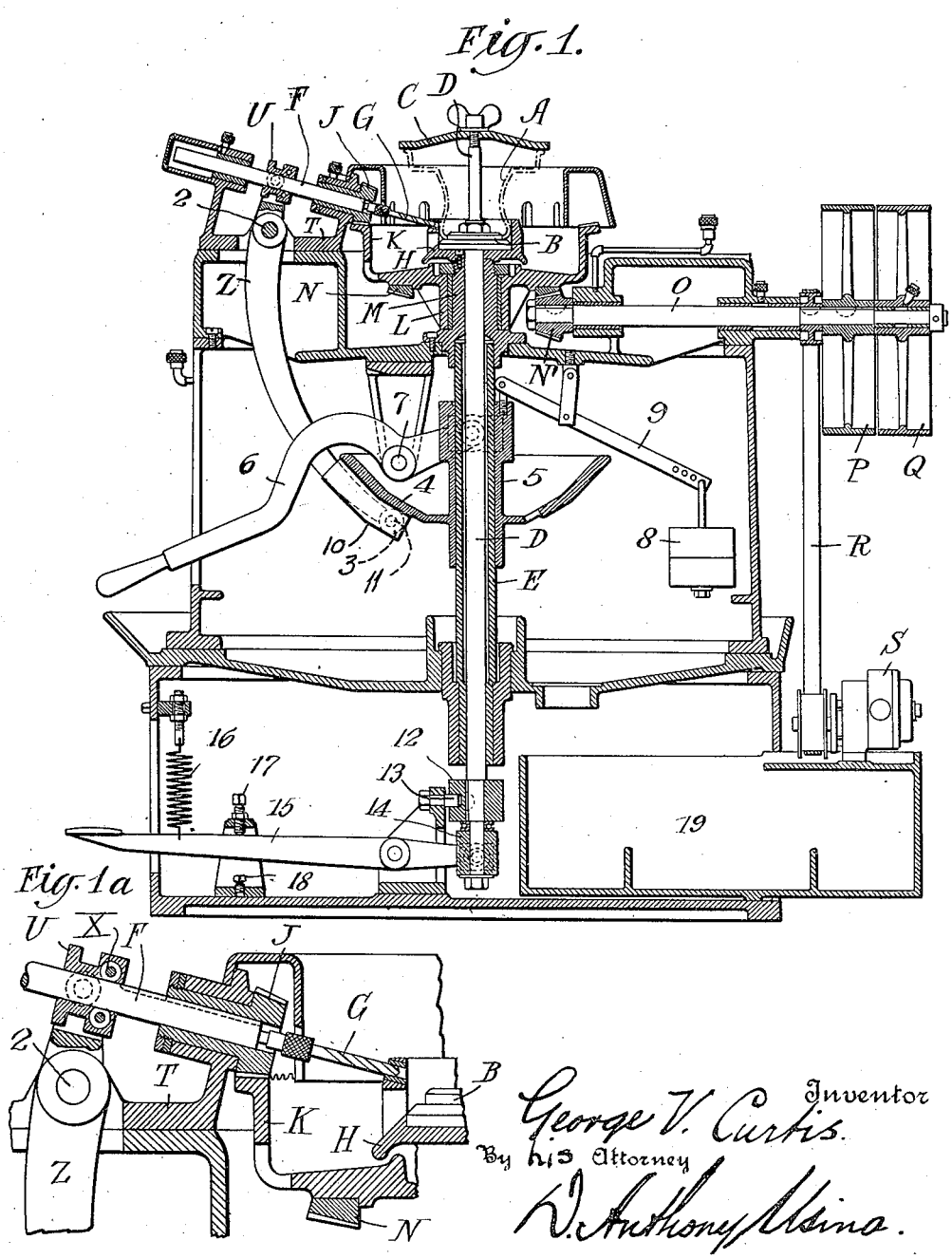

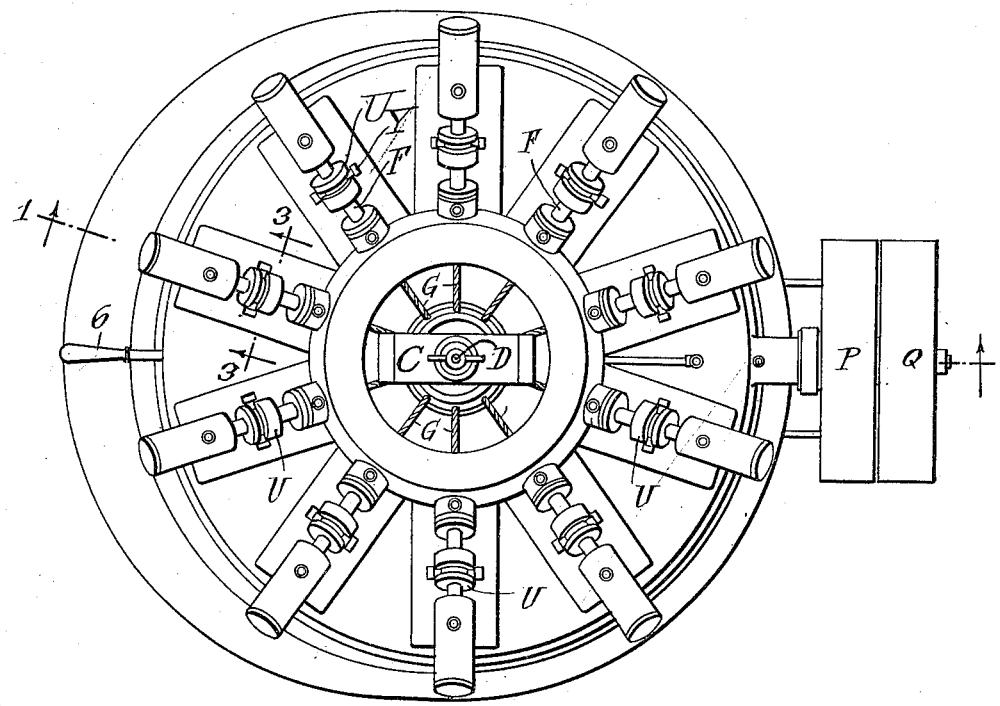
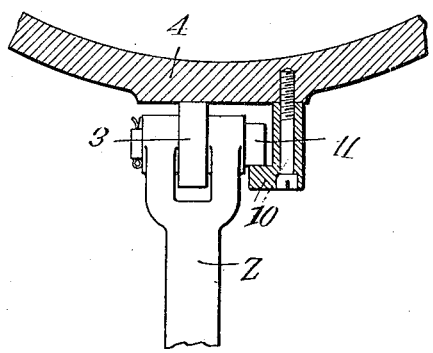
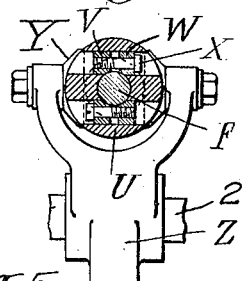
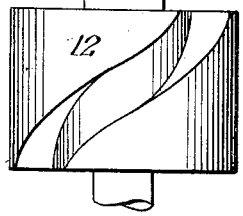

GEORGE V. CURTIS, OF SPRINGFIELD, MASSACHUSETTS, ASSIGNOR TO BAUSH MACHINE TOOL COMPANY, A CORPORATION OF MASSACHUSETTS.

DRILLING-MACHINE.

1,320,208.   Specification of Letters Patent.   Patented Oct. 28, 1919.

Application filed July 24, 1917. Serial No. 182,413.

*To all whom it may concern:*

Be it known that I, GEORGE V. CURTIS, a citizen of the United States, residing in Springfield, Massachusetts, have invented certain new and useful Improvements in Drilling-Machines, of which the following is a specification.

My invention aims to provide an improved drilling machine for drilling wheel hubs or similar articles in which a number of holes are to be drilled at successive intervals around the work either at right angles to the axial line or at an oblique angle thereto. With my improved machine work of this class can be done very rapidly and accurately.

The accompanying drawings illustrate a machine embodying the invention.

Figure 1 is a longitudinal section taken approximately on the line 1—1 of Fig. 2;

Fig. 1$^a$ is an enlargement of a detail of Fig. 1;

Fig. 2 is a plan;

Fig. 3 is a section on the line 3—3 of Fig. 2;

Fig. 4 is a horizontal, partly sectional view of a feeding cam;

Fig. 5 is an elevation of an indexing cam.

Referring now to the embodiments of the invention illustrated, the hub or other workpiece is indicated in dotted lines at A. The machine is designed to drill ten holes in each, of two rows, one row being located above the other near the small end of the hub. The position illustrated is that in which the work is first set, for the drilling of the upper row of holes.

The lower, open, end of the hub is placed on a centering plate B, having a boss which fits the opening in the hub, and is clamped down on the centering plate by means of a strap C which bears on the top of the hub and is forced down by a thumb nut on the top of the central shaft D of the machine, on which also the centering plate B is mounted. The shaft D passes freely through a sleeve E which is fixed at its opposite ends in the frame of the machine.

Ten drill spindles F, each carrying a drill G are arranged around the top of the machine at proper spaces to drill the desired holes. In Fig. 1 only one of these drills and drill spindles is illustrated, the remainder being omitted for the sake of clearness. A stationary guide H is provided with holes through which the ends of the drills are guided, these holes being usually provided with bushings, shown in Fig. 1$^a$, and other holes, flaring toward the outside, as illustrated, are provided for the escape of oil and chips.

Each of the drill spindles carries at its inner end a bevel gear J, the gears for all the spindles being driven from a hollow gear K, the hub L of which rotates about a fixed bearing member M. On the under-side of the horizontal portion of the gear K is a bevel gear N which is driven by a pinion N' on the end of a shaft O mounted in suitable bearings in the frame of the machine and driven from belting acting on the fixed and loose pulleys P and Q on the outer end of the shaft. The shaft O in turn, through a belt R drives an oil pump S which forces the oil through any suitable system of tubes. The pinions J on the several drill spindles are provided with long hubs rotating in bearings on the top plate T of the machine, the pinions being held against longitudinal movement and having a splined engagement with their spindles to permit the feeding and retracting movements of the latter. The details of this construction are shown on a larger scale in Fig. 1$^a$. All the drill spindles are thus rotated simultaneously, and they are simultaneously fed and retracted by the following mechanism:

On each spindle there is a grooved spool U, clamped at a proper point on its length by the means shown in Fig. 3. The spool U has two holes bored transversely through it and in each hole are two bushings V and W having a corner shaped to bear on the spindle F, one bushing being tapped and the other bored out to fit a screw X which binds the two together and clamps the spindle in the spool. In the groove of the spool, at opposite sides, are shoes Y carried in the upper forked end of a lever Z pivoted at 2 on the top of the casing and having at its lower end a roller 3 which bears on an approximately cone-shaped cam 4 provided with a tubular hub 5 arranged to slide on the fixed tube E. A hand lever 6 is pivoted at 7 on a fixed bracket and has at its end a pin engaging a cross slot in the upper portion of the hub 5 of the cam so that the handle may be used to lower and raise the cam. The cam is normally held up by means of a weight 8 on the outer end of a lever 9 whose inner end is pivotally attached to the hub 5 of the cam. The cam 4 carries, for each of the spindle feed levers Z an overhanging bar 10 which engages a second roller 11 on the lower end of the lever, thus holding the lower end of the lever against the cam 4. When the hand lever 6 is raised the cam is pushed down, advancing the spindle first with a comparatively rapid motion to the point of engagement with the work and then with a slower motion feeding it through the work. When the holes have been drilled the hand lever 6 is lowered and the weight lifts the cam and the lower ends of the feed levers Z are drawn inward, retracting the drills.

When the drilling of the first row of holes has been completed and the drills withdrawn the work is raised to bring it into position for drilling the next row of holes. Generally the holes of the next row will be staggered with relation to those of the first row and the machine is designed not only to lift the work to the proper level but also to turn it through the desired angle.

On the lower end of the shaft D is a cam 12 (Fig. 5) with a spiral groove into which enters a fixed pin 13. The cam is keyed on the shaft so that as the latter is raised it is also turned through the desired angle. The shaft carries at its lower end a pivotally mounted block 14 having a transverse groove engaged by a pin on the end of a foot lever 15 which is held up by a spring 16 and is adapted to oscillate between adjustable stops 17 and 18. The operator depresses the treadle 15 until it strikes its lower stop, and holds it there, thus holding the work in its elevated and turned position, and at the same time lifts the hand lever 6 to complete the drilling and then lowers it to withdraw the drills and lets up the treadle to restore the parts to their original positions. The work is then unclamped and removed and a new piece inserted. The machine is stopped and started by shifting the belt from one to the other of the fast and loose pulleys P and Q.

The lever 15 may be arranged for operation by hand instead of foot, and the term "manual operation" is used herein to include operation either by the hand or by the foot of the operator.

In the base of the machine is an oil tank 19 from which the oil is pumped by the pump S and distributed by any usual or suitable arrangement of piping to the work, whence it flows through openings in the horizontal diaphragms of the frame back into the tank 19. The sides of the machine may be provided with openings and cover plates of any usual or suitable type, and various additions may be made and changes in the details and in the arrangement of the parts without departing from the invention as defined in the following claims.

What I claim is—

1. A machine for drilling automobile wheel hubs or the like including in combination a plurality of radial downwardly extending drill spindles, bevel pinions arranged to rotate and permit an axial movement of said spindle, a bevel drive gear for said pinions which is formed with a depressed chamber, an axially movable work supporting shaft which passes through the center of said drive gear, a work centering plate carried by the supporting shaft, a fixed guide member located within the chamber formed in the drive gear and surrounding said work centering plate and having apertures therein to guide the drills and a clamp for holding the work on the centering plate.

2. In a machine for drilling automobile wheel hubs or the like including in combination a plurality of radial downwardly extending drill spindles, bevel pinions arranged to rotate and permit an axial movement of said spindle, a bevel drive gear for said pinions which is formed with a depressed chamber, an axially movable work supporting shaft which passes through the center of said drive gear, a work centering plate carried by the supporting shaft, a fixed guide member located within the chamber formed in the drive gear and surrounding said work centering plate and having apertures therein to guide the drills, a clamp for holding the work on the centering plate, a cam for simultaneously feeding the drill spindles, and intermediate levers between said cam and said drill spindles.

3. In a machine for drilling automobile wheel hubs or the like including in combination a plurality of radial downwardly extending drill spindles, bevel pinions arranged to rotate and permit an axial movement of said spindle, a bevel drive gear for said pinions which is formed with a depressed chamber, an axially movable work supporting shaft which passes through the center of said drive gear, a work centering plate carried by the supporting shaft, a fixed guide member surrounding said work centering plate and having apertures therein to guide the drills, a clamp for holding the work on the centering plate, the guide member being located within the chamber formed in the drive gear and a lever for reciprocating the work supporting shaft axially, adjustable stops controlling the axial movement of the shaft and a cam secured to said work supporting shaft for converting the axial movement thereof to a rotary movement.

In witness whereof, I have hereunto signed my name.

GEORGE V. CURTIS.

Copies of this patent may be obtained for five cents each, by addressing the "Commissioner of Patents, Washington, D. C."